United States Patent [19]

Greenfield, Jr.

[11] Patent Number: 4,651,862
[45] Date of Patent: Mar. 24, 1987

[54] DUAL TEMPERATURE BEVERAGE DISPENSER WITH REMOVABLE OPERATING MODULE

[76] Inventor: Irving E. Greenfield, Jr., 5331 SW. 92 St., Miami, Fla. 33156

[21] Appl. No.: 742,916

[22] Filed: Jun. 10, 1985

[51] Int. Cl.[4] .......................... G07F 13/06; B67D 5/56
[52] U.S. Cl. .................................... 194/344; 194/214; 133/3 D; 222/2; 222/89; 222/105; 222/129.1; 222/138; 222/142; 222/146.2; 222/165; 222/571; 222/189
[58] Field of Search .......................... 222/2, 81, 89, 105, 222/129.1, 129.3, 132, 138, 142, 146.2, 164, 165, 182, 255, 325, 330, 571, 129.4, 130, 173, 189; 133/3 D; 194/214, 344, 345; 312/107.5; 285/158, 239; 339/147 R

[56] References Cited

U.S. PATENT DOCUMENTS

| | | | |
|---|---|---|---|
| 544,077 | 8/1895 | Alexander | 194/344 X |
| 1,115,661 | 11/1914 | Goetz | 194/214 |
| 1,182,963 | 5/1916 | Beck | 194/345 X |
| 1,472,297 | 10/1923 | Falconer | 194/214 |
| 2,682,984 | 7/1954 | Melikian et al. | 222/2 X |
| 3,189,223 | 6/1965 | Mackal | 222/189 X |
| 3,237,810 | 3/1966 | Gran | 222/131 X |
| 3,248,017 | 4/1966 | Allen | 222/189 |
| 3,261,506 | 7/1966 | Chenoweth et al. | 222/333 X |
| 3,266,672 | 8/1966 | Dean | 222/129.1 |
| 3,382,897 | 5/1968 | Skiera et al. | 222/129.1 |
| 3,625,402 | 12/1971 | Kulis | 222/129.3 |
| 3,711,130 | 1/1973 | Betzler | 285/239 |
| 3,737,076 | 6/1973 | Gardner, Jr. et al. | 222/146.2 |
| 3,750,908 | 8/1973 | Bauerlein et al. | 222/325 X |
| 3,884,389 | 5/1975 | Martin | 222/129.4 X |
| 4,076,147 | 2/1978 | Schmit | 222/105 X |
| 4,174,872 | 11/1979 | Fessler | 222/129.1 X |
| 4,245,680 | 1/1981 | Greenfield, Jr. et al. | 222/132 X |
| 4,270,673 | 6/1981 | Rodth | 222/129.1 |
| 4,316,557 | 2/1982 | Benoun et al. | 222/129.1 |
| 4,450,987 | 5/1984 | Boettcher et al. | 222/105 X |
| 4,478,357 | 10/1984 | Jenkins | 222/129.1 |
| 4,497,343 | 2/1985 | Brown et al. | 222/129.1 |
| 4,592,490 | 6/1986 | McMichael | 222/129.1 |

FOREIGN PATENT DOCUMENTS

| | | | |
|---|---|---|---|
| 2400832 | 7/1975 | Fed. Rep. of Germany | 222/146.2 |
| 2415791 | 10/1975 | Fed. Rep. of Germany | 222/142 |

Primary Examiner—Joseph J. Rolla
Assistant Examiner—P. McCoy Smith
Attorney, Agent, or Firm—Harvey B. Jacobson

[57] ABSTRACT

A dual temperature beverage dispenser for providing a variety of beverages, both hot and cool from a small, high capacity, coin-activated unit. The dispenser includes a removable operating module which can be stored for safekeeping separate and apart from a water storage unit which becomes inoperative when the operating module is removed. The water storage unit includes a hot water heater including a tank and a storage tank for ambient water oriented above the hot water heater tank for gravity flow of ambient water to the hot water heater tank when required and for gravity flow to a discharge point in the operating module to enable ambient or cool water to be obtained without payment or beverage to be obtained from the dispenser by use of an appropriate coin or token. The water discharge assembly includes a screen in a projecting nipple which automatically couples and uncouples with the operating module when it is installed on or removed from the water storage unit to prevent drippage when the operating module is removed and also the operating module includes a coin control and rejection system to assure proper payment for a beverage dispensed from the dispenser.

14 Claims, 12 Drawing Figures

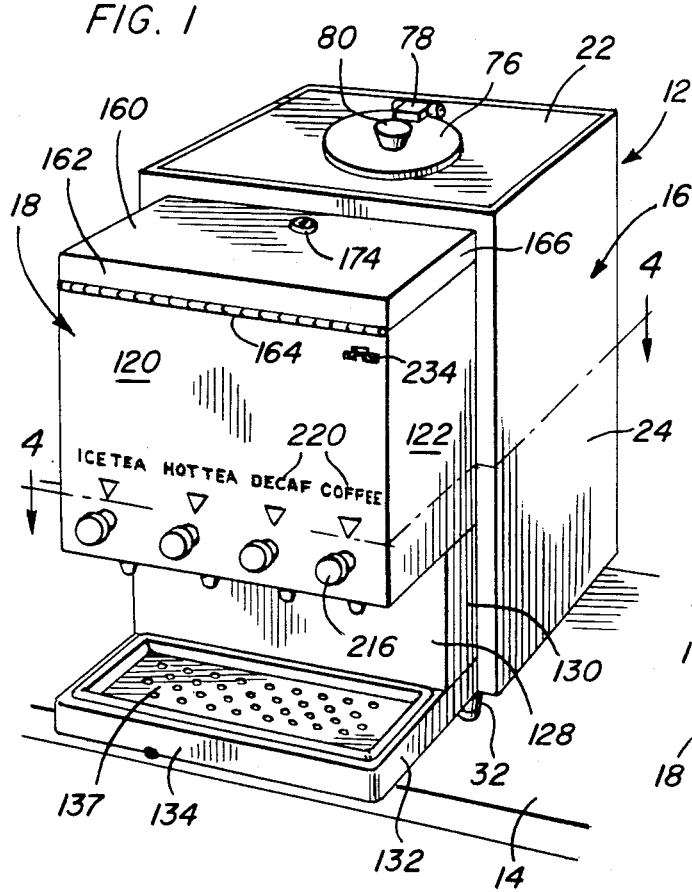
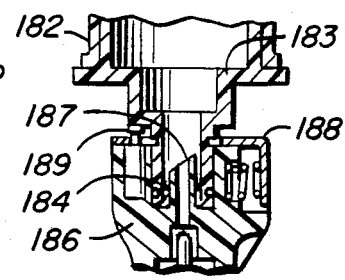
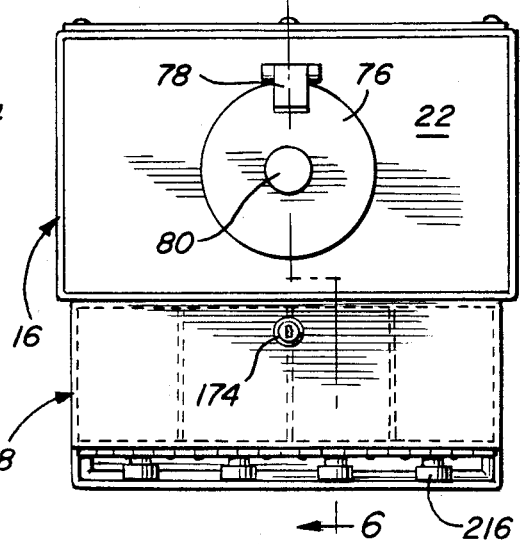
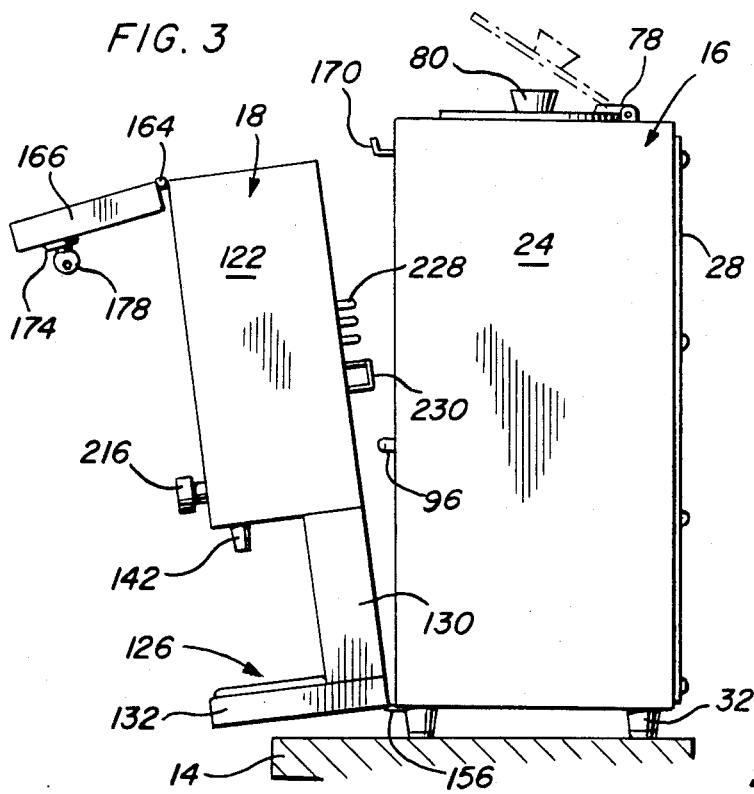
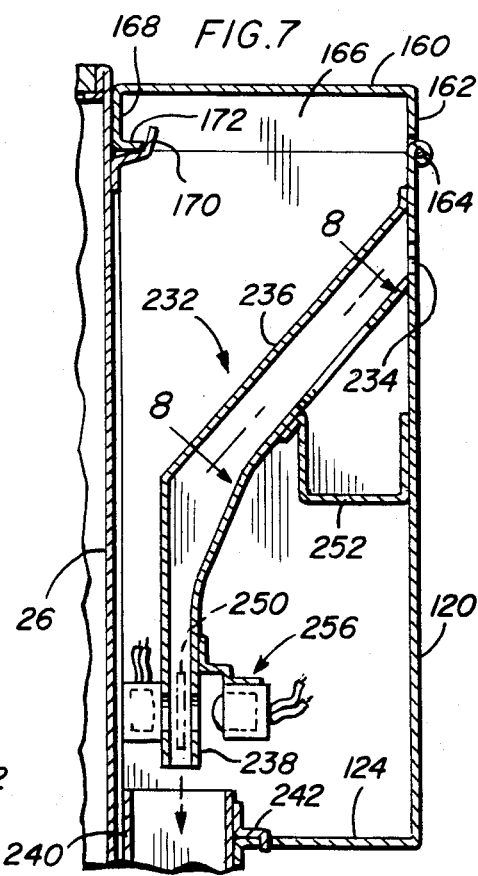

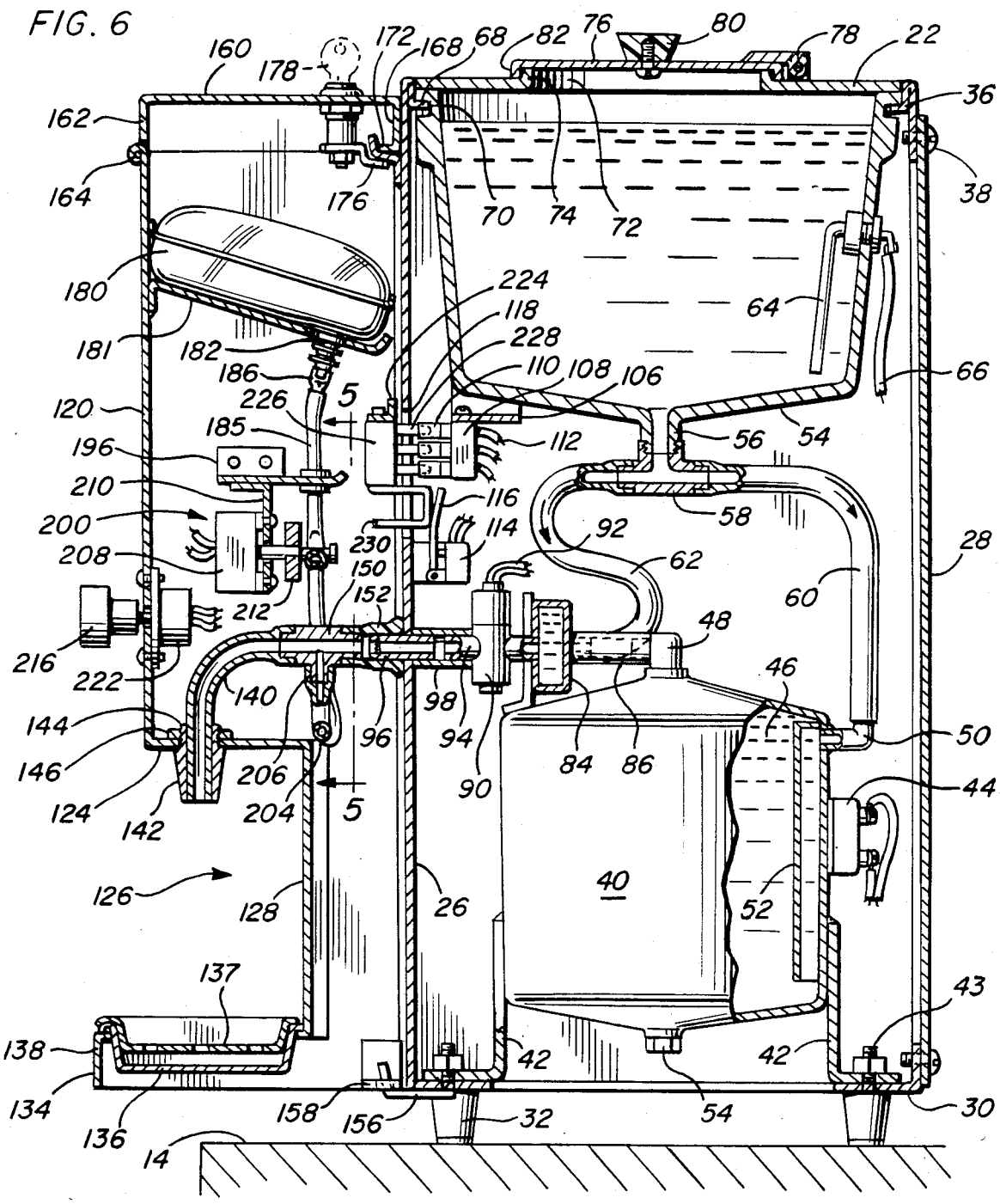

DUAL TEMPERATURE BEVERAGE DISPENSER WITH REMOVABLE OPERATING MODULE

BACKGROUND OF THE INVENTION

1. Field of the Invention

The present invention generally relates to a dual temperature dispenser for dispensing a plurality of beverages, either hot or cold, from a relatively small, high capacity unit in which the entire operating portion is oriented in a removable module for easy removal for safekeeping thus leaving a water storage unit in place and in inoperative condition. The dispenser includes a two temperature water tank and delivery system, an anti-drip device to prevent water leakage after activation ends, and a structure to permit hot or cold water to be dispensed at any time at no cost and a simple coin control system that requires deposit of a coin or token for dispensing a beverage.

2. Description of Related Art

Beverage dispensers of various types have been commercially available for a number of years in which liquid concentrates or syrups are dispensed into disposable cups along with a quantity of liquid to provide a desired beverage. Various types of coin control mechanisms have been provided for use in certain installations and beverage dispensers are also provided without coin control apparatuses to enable them to be utilized in other installations such as a food serving line or the like. The following U.S. patents relate to beverage dispensers of the general type disclosed in this application:

U.S. Pat. No. 2,487,999
U.S. Pat. No. 2,822,112
U.S. Pat. No. 2,949,993
U.S. Pat. No. 3,195,588
U.S. Pat. No. 3,261,506
U.S. Pat. No. 3,237,810
U.S. Pat. No. 4,333,587

SUMMARY OF THE INVENTION

The present invention has for its primary object the provision of a dual temperature beverage dispenser for dispensing hot or cool beverages or water with the dispenser being relatively small to occupy very little space and provided with high capacity characteristics and including as one of its significant features, the provision of a removable module containing all of the operating mechanism for the dispenser so that the operating module can be removed for safekeeping thus leaving a water storage unit in place with the water storage unit being inoperative as long as the operating module is removed.

Another object of the invention is to provide a dispenser in accordance with the preceding object which includes a dual temperature water tank and delivery system having an anti-drip device to prevent water leakage after activation of the dispensing cycle.

Still another object of the invention is to provide a dispenser in accordance with the preceding objects having a relatively simple coin control system which enables water to be removed from the dispenser at any time but prevents the dispensing of a beverage product without activation of the coin control system by an appropriate coin or token.

A still further object of the invention is to provide a beverage dispenser in accordance with the preceding objects in which the liquid concentrate for each individual beverage is provided with a pump for accurately discharging a predetermined quantity of liquid concentrate or syrup for each cycle of operation with the pump being a motor driven peristaltic pump.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the dispenser of the present invention.

FIG. 2 is a top plan view of the dispenser.

FIG. 3 is a side elevational view of the dispenser illustrating the removable module being separated from the water storage unit.

FIG. 6 is a vertical sectional view taken substantially upon a plane passing along section line 6—6 on FIG. 2 illustrating the structural association of the components of the dispenser.

FIG. 7 is a detailed sectional view of the coin control apparatus.

FIG. 8 is a fragmental sectional view taken along section line 8—8 on FIG. 7 illustrating the bottom structure for the coin chute.

FIG. 9 is a perspective view of a token which can be used in lieu of a coin for actuating the dispenser.

FIG. 10 is a detailed elevational view with a portion shown in section of a discharge assembly illustrating the tapered configuration of the male portion of the telescopic detachable connection.

FIG. 11 is a detailed sectional view of the connector and support for the product discharge tube.

FIG. 12 is a detailed sectional view of the connection between the product discharge tube and product container.

DESCRIPTION OF THE PREFERRED EMBODIMENT

Figure 4:
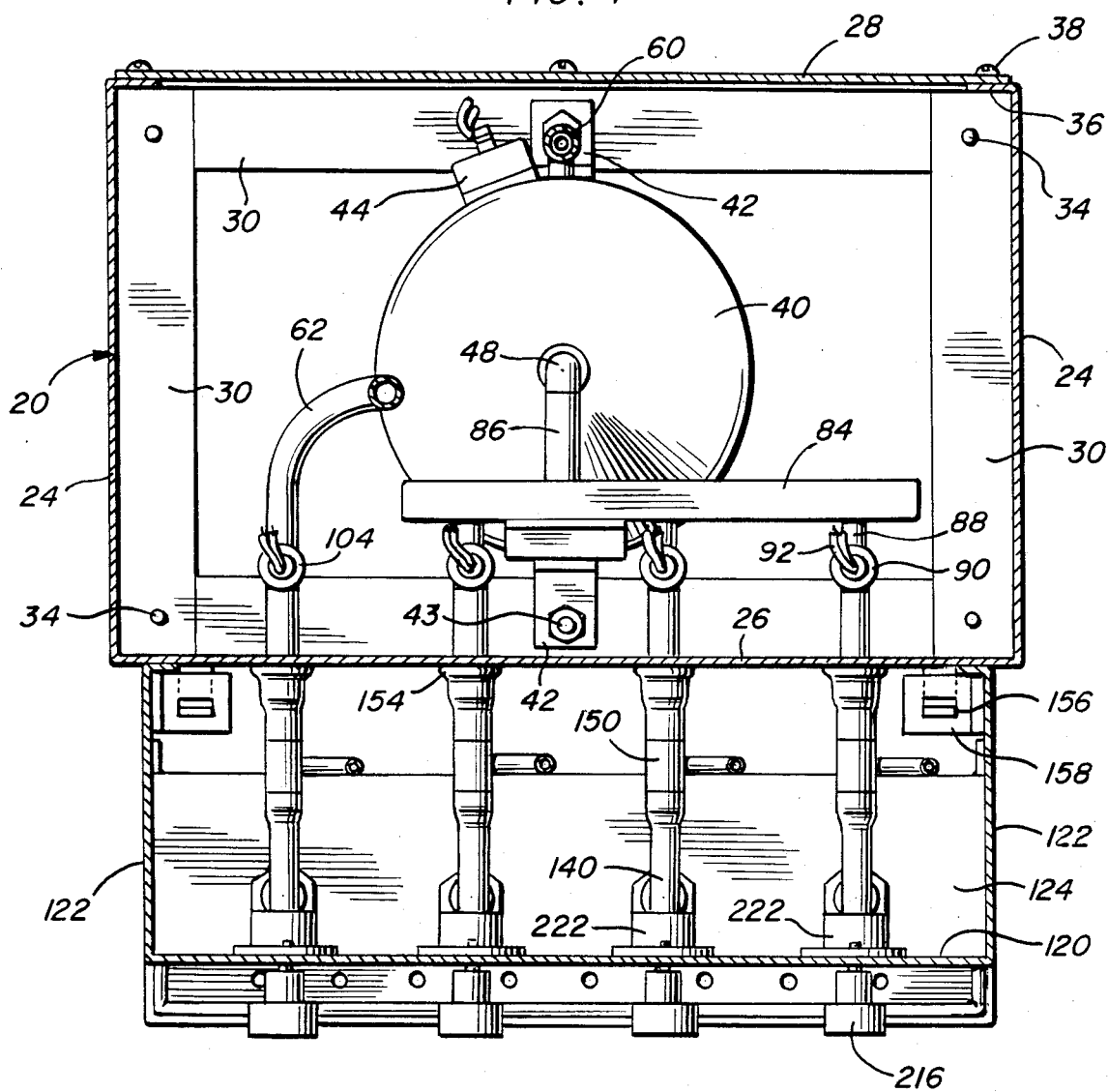
FIG. 4 is a transverse, plan sectional view taken substantially upon a plane passing along section line 4—4 on FIG. 1 illustrating the structural details of the dispenser.
Figure 5:
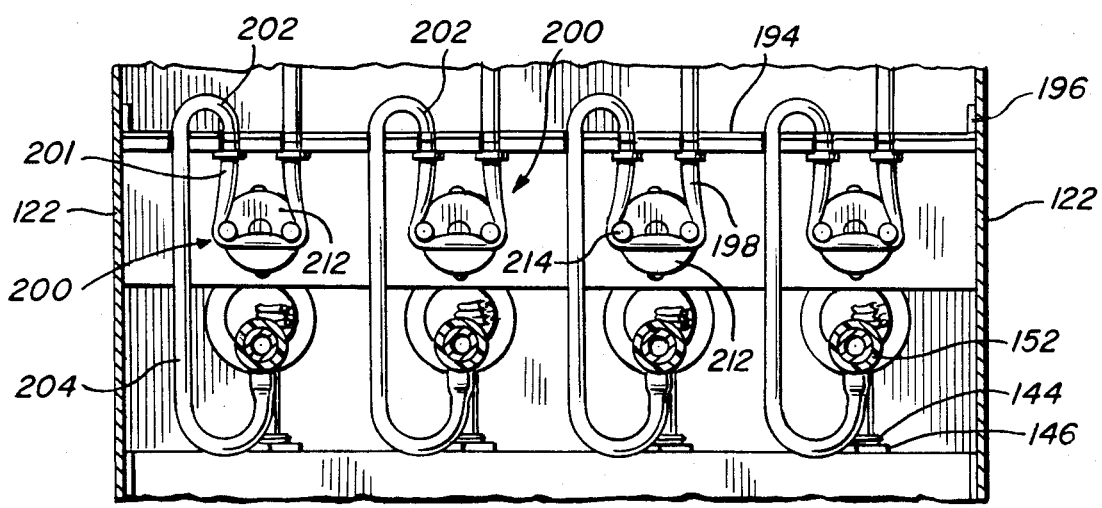
FIG. 5 is a fragmental sectional view taken substantially upon a plane passing along section line 5—5 on FIG. 6 illustrating the orientation of the pump units and discharge assemblies.

Referring now specifically to the drawings, the dispenser of the present invention is generally designated by reference numeral 12 and is adapted to be conveniently supported from any suitable supporting surface 14 such as a countertop or the like which may be part of a food serving line in a cafeteria or the dispenser may be supported in any convenient location in various types of establishments which serve beverages. The dispenser 12 includes a water storage unit 16 and an operating module 18 mounted on the forward surface of the water storage unit 16 and being separable therefrom so that the removable operating module 18 can be removed and stored for safekeeping while the water storage unit 16 can remain in place on the supporting surface 14.

The water storage unit 16 includes a vertically oriented housing 20 provided with a substantially horizontal top wall 22, vertical side walls 24, a front wall 26 and a removable rear wall 28 and an inturned bottom peripheral flange 30 having a plurality of resilient supporting feet 32 attached thereto by suitable fastening bolts 34 or the like. The removable rear wall 28 overlies and is removably secured to an inturned peripheral flange 36 by screw-threaded fasteners 38 or the like thereby providing a closed interior space that is provided with a bottom plate and a rear wall 28 to prevent access to the interior of the machine with either or both being removable to provide access when necessary.

Mounted in the housing 20 is a thermostatically controlled electric hot water heater tank 40 having depending, outwardly turned L-shaped brackets 42 fixed thereto and supported from the front and rear bottom flanges 30 by fastening bolts 43. The hot water heater tank 40 includes an electrical connecting assembly 44 and a thermostat and heating element of conventional construction to maintain water 46 in the tank 40 within a predetermined temperature range. The ends of the tank 40 may be domed with the upper end including a hot water outlet 48 and the upper side portion of the tank 40 is provided with a cold water inlet 50 having a vertically extending baffle 52 closed at the upper end to assure that cold water will actually enter the tank 40 at the bottom thereof. The bottom dome end of the tank 40 is provided with a drain plug 54 in order to remove sediment from the tank and clean the tank when desired.

Also mounted in the housing 20 and adjacent the upper end thereof is a cold water storage tank 54 which has a bottom outlet 56 connected with a tee coupling 58 in which one branch has a tube 60 connected thereto that is connected with the cold water inlet 50 in the hot water heater tank 40. The other end of the tee coupling 58 includes a tube or hose 62 extending therefrom for a purpose described hereinafter. The tank 54 is provided with a low water level sensing device 64 provided with an electrical conductor 66 by which a signal will be activated when the water level in the tank 54 reaches a predetermined low point. The upper end of the tank 54 includes an outwardly extending peripheral flange 68 resting on a downturned and inwardly extending flange 70 which is continuous along the front wall 26, side walls 24 and rear wall flange 36 to form a ledge for supporting the tank 54. The top wall 22 of the housing 20 overlies the flange 68 and may be secured in place or merely rests in place by gravity with it being preferable to secure the top wall 22 in place by suitable fasteners or the like extending into the flange 70. The top wall 22 is provided with an enlarged centrally located filler opening 72 defined by an upstanding peripheral lip 74 having a rounded edge to engage with a filler cap or lid 76 of corresponding shape which is hingedly supported by a hinge structure 78 at the edge of the lid 76 adjacent the rear edge of the top wall 22 as illustrated in FIG. 6. A knob 80 is provided for lifting and manipulating the lid 76 and the periphery of the lid 76 is provided with a depending flange 82 which telescopes with respect to the lip 74 thereby forming a secure closure for the water storage tank 54 and yet one which can be easily opened to enable water to be poured into the tank 54. With this arrangement, the dispenser can be used in installations where a water supply line is not readily available with the low water sensing device 64 indicating to operating personnel that the supply of water in the water storage tank 54 must be replenished by using a suitable container to pour water through the filler opening 72. Alternatively, the dispenser may be connected to an in-house water supply line which may be connected directly to the tubes 60, 62 thus eliminating the water storage tank 54 if desired or the waterline may be connected to the water storage tank 54 and controlled by a suitable float valve or the like.

The hot water outlet fitting 48 at the top of the hot water heater tank 40 is connected to a horizontally disposed manifold 84 through a pipe or tube 86 with there being a plurality of discharge tubes or pipes 88 connected with the manifold 84 with the embodiment illustrated including three discharge pipes although this number may vary. In each of the discharge pipes, there is provided a solenoid controlled valve 90 having electrical conductors 92 connected thereto for opening and closing the valve for discharging hot water into a pipe nipple or tube 94 that is connected to a discharge fitting or nipple 96 through a connector 98 which telescopically engages the nipples 94 and 96 as illustrated in FIG. 6. The nipple 94 extends through and is fixedly attached to the front wall 26 and terminates in a projecting tapered outer end 100 having an anti-drip filter screen 102 therein as illustrated in FIG. 10. The hose or tube 62 from the tee coupling 58 is connected to a solenoid valve 104 similar to the valve 90 with the valve 104 being connected to an identical projecting nipple 96 which projects through and is secured to the front wall 26 so that only cold water is discharged when the solenoid valve 104 is actuated to open a flow path from the cold water storage tank 54 to the forwardly projecting nipple 96.

Mounted on a bracket 106 below the water storage tank 54 and adjacent the front wall 26 is a terminal block 108 having a plurality of female electrical socket components 110 associated therewith with the terminal block 108 including electrical conductors 112. An interlock switch 114 is mounted on the front wall below the terminal block 108 and includes an actuating arm 116 oriented inwardly of an opening 118 extending through the front wall 26 which is in alignment with the arm 116 and the terminal block sockets 110 as illustrated in FIG. 6 for a purpose described hereinafter.

The removable operating module 18 includes a front wall 120, parallel vertical side walls 122 perpendicular with respect to the front wall 120 with the height and width of the front wall 120 being less than the front wall 26 of the storage unit 16. The vertical height of the front wall 120 terminates substantially above the bottom of the operating module 18 and includes a horizontal partition wall 124 which provides a top wall for a serving area 126. An intermediate vertical wall 128 is connected to the rear of the partition wall 124 and extends vertically and is connected to the forward edges of lower side walls 130 which form a continuation of the side walls 122 as illustrated in FIG. 1. The bottom edges of the narrow side wall portions 130 include a forwardly extending side wall portion 132 which extends beyond the front wall 120 with the forward edges thereof being connected by a front wall portion 134 to support a drip tray 136 on inturned peripheral flanges 138 on the top edges of the side wall portions 132, the front wall portion 134 and the bottom edge of the intermediate wall 128 as illustrated in FIG. 6 with the tray 136 forming the bottom of the serving area 126 and generally in parallel spaced relation below the horizontal partition wall 124 as illustrated in FIG. 6. A removable perforated cover 137 is supported on drip tray 136 so that it can be easily removed for cleaning and removing liquid from the tray 136.

Supported in the horizontal partition wall 124 is a plurality of curved pipes 140 which extend through a tubular, tapered grommet 142 which has a threaded portion 144 extending up through apertures in the partition wall 124 with a threaded nut-like member 146 being mounted on the upper end thereof for rigidly securing the tapered grommet and pipe 140 to the partition wall 124. The pipe 140 extends horizontally in the module and includes a tee coupling 150 with the through branch of the tee coupling 150 being connected with an outwardly flared rubber fitting 152 which telescopes over and sealingly engages the projecting nipple 96 with the outwardly flared free end 154 of the flexible fitting engaging and sliding over the tapered outer end 100 of the nipple 96 when assembled therewith with the flared end 154 of the resilient and flexible fitting 152 engaging the front wall 26 when fully telescoped onto the nipple 96 as illustrated in FIGS. 6 and 4.

In order to support the operating module from the front wall 26, a pair of forwardly extending hook-shaped brackets 156 are provided at the lower end of the front wall 26 and the bottom side edges of the module 18 are provided with horizontally disposed inwardly extending slotted brackets 158 which receive the upturned end of the hook-shaped bracket 156 as illustrated in FIG. 6 which enables the upper end of the module to be pivoted inwardly and outwardly and raised off of or placed on the brackets 156. The upper end of the module is provided with a closure lid 160 having a depending forward flange 162 attached to the front wall 120 by a hinge 164 such as a piano type hinge. The lid 160 also includes depending side flanges 166 and an inner or rearward flange 168 to form a continuation of the upper end portion of the module 18 as illustrated in FIG. 1. The front wall 26 of the water storage unit 16 is provided with a hook-shaped bracket 170 which extends inwardly of the module and projects upwardly into the interior of the lid 160 when the lid is in closed position as illustrated in FIG. 6 with the flange 168 including a forwardly extending flange 172 which overlies and is hooked behind the upper end of the hook-shaped bracket 170 when the lid 160 is in closed position. A key operated lock 174 is mounted in the lid 160 adjacent the flange 168 and is provided with a lock arm 176 which swings in a horizontal plane from a position closely underlying the projecting portion of the hook-shaped bracket 170 to a position disengaged therefrom so that when the key 178 is in the lock, the lock arm 176 can be swung from its locked position in underlying relation to the hook-shaped bracket 170 which retains the flange 172 in engagement with the upturned end of the bracket 170 to a position out of engagement with the bracket 170 thus enabling the lid to be pivoted toward the open position as illustrated in FIG. 3 so that the upper end of the operating module 18 can then be tilted forwardly and the operating module separated from the water storage unit by lifting the module upwardly to disengage the hook-shaped brackets 156 from the brackets 158. Thus, the lock 174 and lid 160 coact with the bracket 170 to releasably secure the operating module 18 to the water storage unit 16 to enable complete separation of the operating module 18 from the water storage unit so that the operating module can be stored in a place for safe keeping. When the operating module is removed, the storage unit 16 includes projecting brackets 156 and 170 and projecting nipples 96 with the front wall 26 also including an opening 118 which is aligned with the terminal sockets 110 and the switch arm 116.

Positioned internally of the module 18 is a plurality of product containers 180 in the form of flexible pouches supported in downwardly and inwardly inclined relation by an inclined shelf or bracket 181 fixedly attached to the front wall 120 and side walls 122 since the rear portion of the module 18 is open although provided with inturned flanges for rigidity. The pouch 180 includes a tubular neck 182 which extends through a corresponding opening in shelf 181. The neck 182 terminates in a reduced sleeve 183 having a penetrable membrane 184 therein which forms a seal for the product container 180. A dust cap may be provided on the sleeve 183 to keep it clean during handling and transportation prior to placement in the dispenser. A flexible product discharge tube 185 is connected to sleeve 183 by a coupler 186 which telescopes over the sleeve 183 and includes a pointed tubular member 187 which penetrates the membrane 184 when the coupler 186 is telescoped over the sleeve 183. A spring biased retainer 188 secures the coupler 186 in its inward position on the sleeve with a spring loaded latch 189 keeping the retainer 188 in unlocked position until the coupler 186 is fully inserted onto sleeve 183. The coupler 186 is connected to the pouch 180 with the latch or retainer 188 snapping into position and membrane 184 is penetrated for flow of material through tube 185. The pouch is positioned as shown in FIG. 6 and since there is no air in the pouch, it collapses around the remaining product as it empties thereby preventing exposure to contaminating ambient air. The pouch is disposable and the small contact area of the coupler is easily cleaned. Each tube 185 extends downwardly and is connected to a connecting and supporting grommet 190 as illustrated in FIG. 11 with the grommet 190 including a peripheral groove 192 supportingly engaging a plate structure 194 attached to supporting brackets 196 which are attached to the side walls 122. A tube or hose 198 is connected to the lower end of the grommet connector 190 and extends downwardly and is engaged by a peristaltic pump assembly generally designed by numeral 200 with the tube or hose 201 then extending upwardly through a grommet 202 similar to that illustrated in FIG. 11 and then reverses itself with the tube 204 forming a continuation thereof extending downwardly and reversing itself and turning upwardly and being connected to the lateral branch 206 of the tee fitting or coupling 150 so that a predetermined quantity of liquid concentrate may be discharged into the flow path of the water as it moves from the hot water heater tank 40 or the cold water storage tank 54 to one of the tapered nozzles 142 which form discharge spouts for the beverage constituted by the mixed water and liquid concentrate.

Each peristaltic pump includes a gear head electric motor 208 supported from a depending bracket 210 attached to the supporting plate 194 and including a circular plate 212 mounted on the output shaft thereof with the plate 212 including a pair of rollers 214 spaced diametrically apart on the circular plate 212 so that for each revolution of the circular plate 212, a predetermined quantity of liquid concentrate will be squeezed through the tube 201 and discharged into the tee coupling 150 and thus into the water as it is discharged from the spout or nozzle. In some instances, when the product being dispensed permits, the peristaltic pump 200 may be replaced with a venturi unit for dispensing a desired quantity of product into the water at coupling 150.

The front wall 120 is provided with a plurality of control knobs or buttons 216 associated with indicia 220 and provided with a switch structure 222 inwardly of the front wall 120 so that by operating one of the selected knobs or control buttons 216, a selected beverage or water only may be dispensed with the consumer placing a suitable cup, receptacle, disposable cup or the like under the appropriate nozzle or spout.

The rear of the module is provided with a supporting bracket 224 which supports a terminal block 226 having male projecting contact pins 228 which will telescopically engage and electrically connect to the sockets 110 when the module 18 is assembled onto the front of the storage unit 16. Also, the terminal block 226 supports a projection 230 which will engage the switch arm 116 to close the interlocking switch when the operating module is in place and open the interlocking switch when the module 18 is removed with the pins 228 and projection 230 being aligned with the opening 118 for contact, registry and engagement with the sockets 110 and switch arm 116 respectively. The projection 230 is aligned with and projects beyond the male pins or plugs 228 to protect them from damage or shield them in the event the operating module is positioned with the rear surface thereof engaging a support surface or other object. When the module is removed, the forward tilting as illustrated in FIG. 3 separates the pins 228 from the sockets 110 and opens the interlock switch 116 and telescopically disconnects the flexible fittings 152 from the projecting nipples 96 so that the module can be lifted off the upwardly projecting ends of the hook-shaped hinge brackets 156 and the module can be reassembled with respect to the water storage unit by reversing this procedure with the lockable lid 160 serving to lock the module in place on the water storage unit or permit removal thereof by operating the key operated lock 174.

The operating module also includes a coin control apparatus which controls the electrical circuitry in a conventional manner with the coin control apparatus including a simplified coin or slug collecting system illustrated in FIG. 7 and generally designated by reference numeral 232 with this system including a slot 234 in the front wall 120 adjacent an upper corner thereof and a downwardly inclined chute 236 extending downwardly and inwardly from the slot 234 with the lower end of the chute including a vertically extending portion 238 communicating with a coin tube or chute 240 extending to a collection box, chamber or the like or the tube 240 may be the collection box itself with the tube 240 including a hook-shaped bracket 242 supported on the intermediate wall 124 in a conventional manner. The bottom wall 244 of the chute 236 includes an oval-shaped opening 246 having a particular width dimension to enable small coins 248 to drop therethrough while larger coins 250 will be supported by the bottom surface portions of the chute bottom wall 244 on opposite sides of the oval-shaped opening 246 as illustrated in FIG. 8 so that smaller coins will drop through the opening 246 and larger coins will pass down the chute 236. In underlying relation to the opening 246 is a box 252 which holds small coins or anything improper which passes through opening 246 thus preventing their reuse in the dispenser or elsewhere.

At the lower end of the chute 236 just above the terminal end of the vertical portion 238, there is a photocell assembly generally designated by numeral 256 which is of conventional construction which will be occluded when a coin 250 passes between the source of illumination and the sensing device so that a circuit will be completed when a proper coin is dropped into the slot 234 thereby enabling the selection made by operating the selector knob 216 and selector switch 222 to discharge a desired beverage. In the event certain consumers may not be required to pay for the beverage or may pay a lesser fee, a round token may be provided to those consumers with the token being illustrated in FIG. 9 and designated by numeral 258. The token 258 is provided with a specific configuration, that is, provided with a central projection and groove corresponding in shape to the shape of the slot-like opening 234 with the token operating in the same manner as the coin 250 to occlude the photocell assembly and actuate the dispensing mechanism by closing the electrical circuit to the selected beverage concentrate pump and solenoid valve. The particular construction of the token 258 prevents it from being used in other coin control devices due to the ridge and conversely, conventional coins or other tokens cannot be used in the dispenser when the slot 234 is shaped to conform with the ridge and groove configuration of the token 258. However, the dispenser can be provided with a slot 234 to receive coins only or coins and tokens.

The screen 102 in each of the projecting nipples 96 provides an anti-drip feature that, due to surface tension of the water will prevent dripping after the solenoid valve has closed. The tube 201 which is engaged by the pump rollers 214 preferably is a silicone rubber tube which is retained under a tension by constant engagement with the rollers. Also, the introduction of the liquid concentrate in the flow path through the tee coupling 150 assures adequate mixing of the concentrate and water as the beverage is discharged from the spout 142. The details of the electrical circuit are standard components operating in a conventional manner with the photoelectric cell, mercury switch or other coin-sensing switch being provided to provide a coin control to operation of the dispenser with the operating knob and selector switch 222 serving to operate the specific pump and solenoid valve for the selected beverage. The rearward and downward inclination of the product pouches 180 assures that gravity flow will completely empty the product from the containers. When the operating module is separated, all of the product supply and coin control is separated from the then dormant water storage unit with the electrical interconnection separating electrical supply from the water storage unit. The shield which actuates the interlock switch serves the dual safety purpose of masking the plug contacts from being touched by knife-like objects which theoretically could be inserted between the two parts of the machine when they are together and also deenergizing the storage unit receptacle to prevent the same type of tampering when they are apart. The tubing connected to the peristaltic pump is constructed in segments so that the components can be easily removed for replacement, cleaning and tension adjustment. The coin control system is basically constructed to operate when a quarter or token is placed in the machine so that a coin of lesser value and smaller diameter will drop into the return trough. This arrangement is quite inexpensive and enables the use of specially shaped tokens as well as reduces the machine size and reduces the incidence of repair and other maintenance problems accompanying many coin control apparatuses. The angle of the drop chute may be such that the normal weight of a quarter is required to move the coin all the way to the point at which it drops freely past the switch which arms the machine for product dispensing. Other objects such as wood, Bingo markers, poker chips and the like will stay in the chute until a quarter pushes them through allowing delivery of a single drink. While the token is specially shaped and the entrance slot is also specially shaped, the coin chute will also have this special shape continuing throughout its length to provide for insertion of the token and proper tracking of the token while falling down the chute. Thus, the special shape of the chute where it angles precludes the use of other tokens and the special shape of the token provided for this dispenser prevents its use in other coin operated devices. If only a token arrangement is employed, the small coin collecting mechanism can be eliminated if desired. Also, hot water or cold water at ambient temperature can be provided if desired through a separate manual or electrically operated valve. Since the thermostatically heated hot water tank will be maintained at predetermined temperature at all times, this will enable hot water or ambient temperature water to be available at any time without payment whereas dispensing of beverages will require deposit of a proper coin or token. Other variations may be provided including different beverages with ambient water combined therewith depending upon the installational requirements or desires. By providing a water storage tank, it is only necessary to have electrical energy available in order for the dispensing unit to be used thereby eliminating the necessity of providing plumbing facilities which may be required in order to provide a waterline to the dispenser thereby enabling the device to be easily installed or temporarily installed in a food service line and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A dispenser for dispensing a beverage comprising a water storage unit, an operating module and means removably mounting the operating module on the water storage unit to enable complete separation of the operating module from the water storage unit to enable the operating module to be removed and stored for safekeeping while the water storage unit remains in place, said operating module including means selectively discharging beverage product and water from a discharge point into a user receptacle with the operating module and water storage unit including a detachable coupling in a water supply pipe extending between the water storage unit and operating module for automatic uncoupling and coupling when the operating module is removed from or replaced onto the water storage unit, said operating module including a beverage supply container, means supplying a predetermined quantity of beverage product to the discharge point for each cycle of operation of the dispenser and means on the operating module for discharging a predetermined quantity of water to the discharge point for mixing with the beverage product to form a beverage in the user receptacle, said water storage unit including a hot water heater tank, means thermostatically controlling the temperature of the hot water in the hot water heater tank, a valve structure controlling flow of hot water from the hot water heater tank and means on the operating module connected with the valve for actuating the valve for discharge of water, said means for actuating the valve including an electrical circuit including an interlocking switch and male and female components bridging the juncture between the operating module and water storage unit for automatically connecting the electric circuit when the operating module is mounted on the water storage unit and breaking the electrical circuit when the operating module is removed thereby enabling the water storage unit to remain in place and dormant when the operating module is removed.

2. The structure as defined in claim 1 wherein said means connecting the operating module to the water storage unit includes a bottom separable hinge connecting the lower end of the operating module with the water storage unit and a pivotal cap on the operating module including a key operated lock having a swingable lock arm engageable with a projecting bracket on the water storage unit to removably support the operating module on the water storage unit.

3. The structure as defined in claim 2 wherein said beverage product is a liquid concentrate, said means for discharging a predetermined quantity of beverage concentrate to the discharge point includes a flexible tube maintained under tension and engaged by a peristaltic pump for squeezing a predetermined quantity of liquid concentrate through the flexible tube for each cycle of operation of the peristaltic pump.

4. The structure as defined in claim 3 wherein said water storage unit includes an ambient water storage tank mounted above the hot water heater tank and being communicated therewith for supplying water to the hot water heater tank, said water storage tank including a filling opening in the top of the water storage unit to enable the supply of water in the water storage tank to be replenished thereby enabling installation of the dispenser without connection to a water supply line.

5. The structure as defined in claim 4 wherein the water coupling between the water storage unit and the operating module includes a projecting nipple on the water storage unit with the projecting nipple having a tapering outer surface and a screen in the terminal end of the nipple forming an anti-drip screen to prevent drippage of water when the valve is closed, said operating module including a pipe having a flexible fitting telescopically engaged with the nipple when the operating module is mounted on the water storage unit and separable from the nipple when the operating module is removed.

6. The structure as defined in claim 1 wherein said operating module includes a coin control apparatus including a coin chute having an inclined bottom surface provided with an opening of a predetermined size therein whereby small coins will drop through the chute and large coins will pass down the chute to a coin control switch, and collecting means underlying the opening in the bottom of the chute to collect small coins or other objects which drop through the opening.

7. The structure as defined in claim 6 wherein said operating module includes a plurality of operating knobs on the outer surface thereof with each of the knobs being connected with a switch structure for selectively controlling one of a plurality of beverage products supported in the operating module.

8. The structure as defined in claim 7 wherein each of the control knobs controls a peristaltic pump for discharging a predetermined quantity of beverage product to a discharge point and a solenoid valve for discharging a predetermined quantity of water to the discharge point.

9. A dispenser for selectively discharging a quantity of water and a mixture of water and product into a user receptacle comprising a water supply means including a water heating tank, and an operating and control module removably connected with the water supply means to enable the module to be completely separated from the water supply means for safe storage while the water supply means remains in place, said module including means to store a product, selectively actuated means to discharge a quantity of product for mixing with a quantity of water, and means on said module and water supply means to discharge a quantity of water, said means to store a product including a flexible container, said means to discharge said product including a fitting connected to the container in sealed relation thereto and in communication therewith for removal of product from the container with the container collapsing as the product is removed thereby reducing contact of air with the product, said container including a projecting tube with a membrane forming a closure at the end thereof, said fitting including a sleeve telescopically receiving the end of the tube and including a tubular pointed member therein for penetrating the membrane when the tube is inserted into the sleeve, said tube and sleeve including means releasably securing the sleeve and tube in telescopic relation, said means releasably securing the sleeve and tube in telescopic relation including a spring biased member mounted on said sleeve and engaged with the exterior of the tube.

10. In a beverage dispenser, the combination of a water supply unit, an operating module and means separately connecting the module and unit to enable the module to be removed from association with the unit, said water supply unit including a water discharge means and valve means controlling discharge of water from the discharge means, said operating module including beverage discharge means having one end portion automatically coupled to the water discharge means when the module is connected to the water supply unit, said beverage discharge means including another end portion oriented in accessible position for discharging a beverage in a user receptacle, said module including beverage product supply means and control means for discharging a quantity of beverage product into said beverage discharge means, said control means also controlling operation of said valve means controlling discharge of water from the water discharge means into the beverage discharge means, and means automatically connecting the control means on the module to the valve means on the water supply unit when the module is connected to the water supply unit and automatically disconnecting the control means from the valve means when the module is disconnected from the water supply unit.

11. The combination as defined in claim 10 wherein said valve means is an electrically operated valve, said automatic connecting and disconnecting means including contact members in an electric circuit and being mounted on said module and water supply unit for circuit completing engagement when the module is connected to the water supply unit, said electric circuit being connected with the valve and said control means.

12. The combination as defined in claim 10 wherein said water discharge means on the water supply unit includes a pipe nipple projecting from said unit, said one end portion of the beverage discharge means includes a tubular member telescopically engaging the nipple when the module is connected to the water supply unit.

13. The combination as defined in claim 10 wherein said beverage product supply means includes a container for liquid beverage concentrate, said control means includes pump means and manually operated means to enable selective actuation of the pump means and said valve means in the water discharge means.

14. The combination as defined in claim 10 wherein said means separably connecting the module and water supply unit includes a key operated lock mechanism to prevent unauthorized separation of the module and unit.

* * * * *